MECHANICAL DISC PACK TESTER AND METHOD

Filed April 18, 1967 6 Sheets-Sheet 1

INVENTORS:
Charles W. David
Eugene A. Munson
By Smyth, Roston & Pavitt
ATTORNEYS

MECHANICAL DISC PACK TESTER AND METHOD

Filed April 18, 1967 6 Sheets-Sheet 2

INVENTORS:
Charles W. David
Eugene A. Munson
By [signature]
ATTORNEYS

INVENTORS
Charles W. David
Eugene A. Munson
By Smyth, Roston & Pavitt
ATTORNEYS

MECHANICAL DISC PACK TESTER AND METHOD

INVENTORS:
Charles W. David
Eugene A. Munson
By Smyth, Roston & Pavitt
ATTORNEYS INVENTORS:
Charles W. David
Eugene A. Munson
By Smyth, Roston & Pavitt
ATTORNEYS INVENTORS:
Charle W. David
Eugene A. Munson By Smyth, Roston & Pavitt
ATTORNEYS

3,557,461
MECHANICAL DISC PACK TESTER AND METHOD

Charles W. David, El Segundo, and Eugene A. Munson, Torrance, Calif., assignors to Disc Pack Corporation, Hawthorne, Calif., a corporation of California Filed Apr. 18, 1967, Ser. No. 631,705
Int. Cl. G01b 7/28
U.S. Cl. 33—174 20 Claims

ABSTRACT OF THE DISCLOSURE

This disclosure describes a method and apparatus for mechanically testing a disc pack which includes mechanically detecting the deviation of a surface of one face of a recording disc from a true mean position to produce a mechanical output and converting the mechanical output into a reading perceptible to an operator to advise the operator if the deviation exceeds a predetermined magnitude. The disclosure also describes a dynamic testing gauge and method, the gauge being engageable with the recording disc if the movement or flutter thereof upon high velocity rotation of the disc pack exceeds a predetermined amount.

BACKGROUND OF THE INVENTION

Memory or recording discs are thin annular plate-like members on which huge quantities of information can be stored for use in a computer. It is common practice to assemble several of the recording discs in spaced stacked generally parallel relationship to form what is commonly referred to as a disc pack. Each disc pack includes, in addition to the several recording discs and several structural members, a central driving hub. The hub of the disc pack is adapted to drivingly engage a driving member of a data processing unit to rotate the disc pack.

One of the first steps in actual use of the disc pack is to record information on the recording discs. This is done be rotating the disc pack about a central axis thereof at high velocity and moving a recording head radially inwardly between an adjacent pair of the recording discs. The recording head is caused to "fly" over a very thin film of air contiguous a face of the recording disc to record information on the disc. Typically, one recording head is provided for each of the faces on which information is to be stored.

The geometry of the disc pack and recording head is such that there is only a slight clearance space between the recording head and the recording disc as the recording disc is moved radially inwardly to the desired location on the face of the disc at which recording is to begin. This clearance may be of the order of .020 inch. The recording head is then lowered from .020 inch toward the surface on which the recording head is to fly. If the surface contour of the face is sufficiently irregular, the recording head will strike the outer edge of the recording disc during its radial inward movement and will not be allowed to fly on the face of the disc. Similarly the disc must be properly mounted on the disc pack so that the outer edge thereof will not interfere with the radial movement of the recording head. Furthermore, in order for the head to fly properly, it is important that the surface be very smooth and that the disc be properly mounted.

Theoretically therefore all of the faces of the recording discs of a disc pack should be perfectly flat. Further, adjacent recording discs should be parallel and spaced a predetermined distance from each other or, as stated differently, each disc should be a given distance from a reference or datum plane. This theoretical position is referred to herein as the true mean position.

Allowable deviation from the true mean may be of the order of plus or minus .010 inch for each face of the recording disc. In a static condition deviation from the true mean position may result from either variations in surface contour of the disc or from mounting the discs on the disc pack. It is, of course, important that each disc pack be carefully tested and checked to assure that the various discs thereof are within the tolerances allowed. Tests of this type are referred to herein as a static test.

During recording, the disc pack is rotated at high velocities which are typically 1500 r.p.m. and 2400 r.p.m. At each of these speeds various forces referred to herein as dynamic forces act on the disc pack and tend to cause the disc pack to move or flutter away from the true mean position thereof. For example, stress in the mechanical portions of a disc pack can cause flutter of the pack. Likewise, aerodynamic forces can act on the pack and cause movement thereof. Of course, unbalance of the pack would also cause movement or flutter; however, it is assumed that the disc pack has been balanced prior to the time that it is tested in accordance with the present invention. It is important that the dynamic forces not cause the pack to move more than a predetermined amount from the true mean position for, if the disc pack flutters beyond this amount, the problems noted above in connection with the recording head would occur. Therefore, a test for these operating conditions, referred to herein as a dynamic test, is required.

Testing a disc pack to obtain all of this test data is quite complex. First, the space between adjacent discs is very small and may be about 11/32" and therefore, it is difficult to develop testing equipment to suit the disc pack geometry. Further, the disc pack must be kept surgically clean during testing as contamination prevents proper recording of information thereon. In addition, recording areas of the recording disc are very delicate in that even the slightest scratch or abrasion prevents proper recording. Thus, the test equipment must be precision equipment and not as a matter of course roughly engage the delicate recording areas.

Prior art test devices use a noncontact device in an attempt to test the disc pack for the items noted above. This apparatus is not satisfactory because when it is designed sufficiently small to fit between adjacent discs of a disc pack, it is extremely expensive. Furthermore, flutter of the disc pack during high speed dynamic tests beyond a predetermined amount could cause the disc pack to strike and destroy this very expensive test equipment.

SUMMARY OF THE INVENTION

The present invention provides a relatively simple apparatus and method for statically and dynamically testing disc packs. The apparatus is up to four times less expensive than the prior art devices and provides for rapid and efficient testing of the disc packs. An apparatus constructed in accordance with the teachings of this invention can also be operated by relatively unskilled workmen.

One basic concept of this invention is to statically test a disc pack by mechanically detecting the deviation of a face of the recording disc from the true mean position. The mechanical detection must be carefully carried out to avoid scratching of the recording areas on the face of the recording disc. This can be accomplished by utilizing a movable probe which lightly and carefully engages the recording disc. To further assure that damage to the recording areas of the disc will be avoided, it is preferred to engage the probe with a radially narrow peripheral region of the disc which is not adapted for use as a recording area. Preferably one probe is provided for each disc face that is to be statically tested.

Disc packs frequently have several central recording discs both faces of which are used for recording purposes. Although both of the faces must be within the specified tolerances with respect to the true mean position, the present invention teaches that adequate test results are obtained if the deviation along only one face of the disc is mechanically tested.

Although the full area of each recording face from the outer periphery radially inwardly to the inner periphery should desirably be at the true means position, the present invention also teaches that it is sufficient to test the deviation of a circumscribing zone of the disc where such zone circumscribes the central or rotational axis of the recording disc. Preferably the circumscribing zone should lie adjacent the outer periphery or outer edge, as it is the outer edge that the recording head would strike if the disc pack was not within the proper tolerances. Furthermore, any error in mounting the disc is maximum at the outer periphery of the disc. Thus, if the outer peripheral regions of a face of a recording disc are within the required tolerances, it can be safely assumed that the inner regions thereof are also within the proper tolerances.

The circumscribing zone can be advantageously defined by rotating the disc pack with the probe stationary and in engagement with a face of the recording disc. In this instance, the circumscribing zone is circular. Thus, the circumscribing zone defines a test path and the runout or deviation of this test path from the true mean position is measured.

It is important that the probe ride smoothly on the face of the recording disc and not skip or bounce along. Therefore, it is important that the rotational speed of the disc pack be sufficiently low to allow the probe to ride on the face of the disc so that deviation of the disc from the true mean position will impart movement to the probe. Another limiting factor on the speed is that it is desired to read the static test results continuously on a dial as the recording disc rotates, and if the rotational speed were too high it would be difficult to obtain meaningful readings from the dial. It has been found that a speed of about 5 r.p.m. satisfactorily meets both of the requirements.

In the interest of low cost and efficiency, the probe preferably forms part of an electrical displacement transducer. Thus, probe movement or mechanical output, which is a function of test path position relative to a datum plane, is converted into an electrical signal which varies as a function of probe displacement. The electrical signal is then converted into a reading such as a dial reading which is perceptible to the operator.

To assure accuracy of the static test, the present invention teaches calibrating the electrical displacement transducer. As deviation of the recording face of the disc from the true mean position will vary positively and negatively, it is important that the probe when unrestrained be at a true mean or zero position corresponding to the true mean position of the associated disc of the disc pack.

Calibration can be automatically effected by mounting the electrical displacement gauge for movement between an operative position in which the probes are engageable with the faces of the recording discs as described above and an inoperative position in which the probes are moved out of the way of the disc pack so as not to interfere with removal thereof. Calibration is automatically accomplished by providing a calibrating gauge having a plurality of calibrating surfaces which the probes automatically engage when the electrical displacement transducer is in the inoperative position. When the probe engages the calibrating surface, it should cause a zero reading on the dial. Any variation from zero shows the amount of the error.

A second basic concept of this invention is to dynamically test a disc pack using a simple inexpensive go-no-go type of dynamic testing gauge. This concept of the invention may be carried out by rotating the disc pack at a dynamic testing speed and positioning a dynamic testing gauge closely adjacent the true mean position of the recording disc so that if the rotation of the disc pack produces flutter or dynamically induced movement of the recording disc more than a predetermined amount from the true mean position, the recording disc will contact the testing gauge and produce sound audible to the operator. Thus, if the recording disc contacts the dynamic testing gauge, the disc pack fails to pass the dynamic test. By properly constructing and assembling the disc pack and by first statically testing the disc pack, it will be quite unusual if a disc pack does not pass the dynamic test. A primary advantage of the dynamic testing gauge of this invention is its simplicity as it may be embodied in the form of an appropriately machined metal block.

It is important that the rotational speed of the disc pack be sufficiently high so that dynamic forces will act thereon. Furthermore, as the dynamic forces acting on the disc pack are a function of the rotational speed, the disc pack should be dynamically tested at a rotational speed which approximates the rotational speed which the disc pack will be rotated when in actual use.

To prevent unnecessary contact between the dynamic testing gauge and the disk pack, it is preferred to mount the dynamic testing gauge for movement between an operative or testing position and an inoperative position in which the gauge is removed from the immediate vicinity of the disc pack. This also facilitates removal of the disc pack from the testing area.

As the dynamic testing gauge and the electrical displacement transducer must remain precisely calibrated, it is very important that any movement thereof be a precision movement and not effect the calibration of the dynamic testing gauge. The present invention teaches that this function can be accomplished by rotating the dynamic testing gauge and the electrical displacement transducer between the operative and inoperative positions and by providing a simple inexpensive precision bearing assembly for mounting the dynamic testing gauge and the transducer for rotation.

Preferably a supporting structure or testing stand is provided on which a spindle is mounted for rotatably mounting the disc pack. The static testing apparatus and the dynamic testing apparatus are mounted on the same supporting structure closely adjacent the periphery of the disc pack. As the static test requires slow rotation of the disc pack and the dynamic test requires a considerably higher speed rotation of the disc pack, it is important to provide a variable speed drive for accomplishing this function. The present invention provides such a drive which may include a slow motor and a fast motor and drive means interconnecting both of the motors and the spindle so that either of the motors can drive the other motor and the spindle. A centrifugal clutch disconnects the first motor to make the latter freewheeling at speed above the output speed thereof. Thus, the centrifugal clutch is operative to disconnect the slow motor during the dynamic test.

The invention, both as to its organization and method of operation together with further features and advantages thereof may best be understood by reference to the following description taken in connection with the accompanying drawings.

DESCRIPTION OF THE PREFERRED EMBODIMENT

Figure 1:
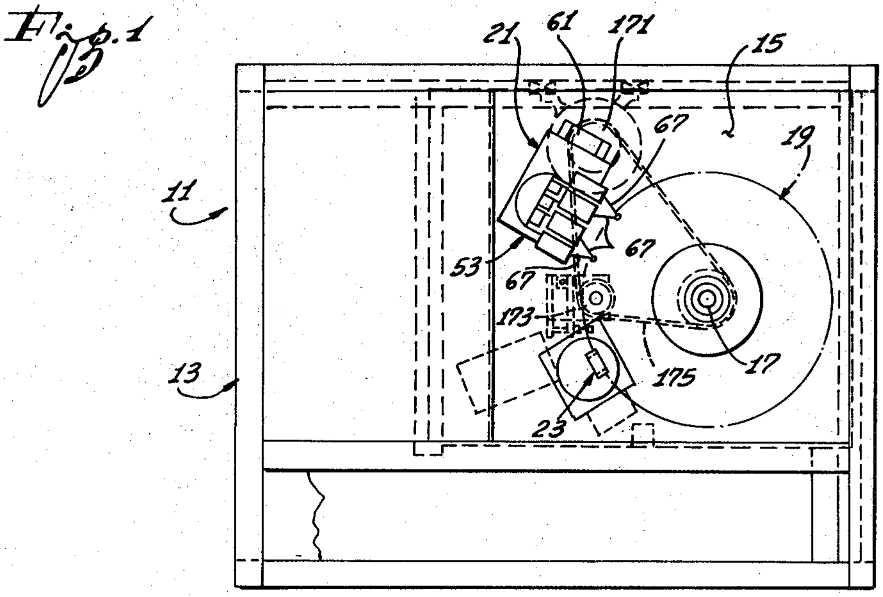
FIG. 1 is a top plan view of a mechanical testing apparatus constructed in accordance with the teachings of this invention.
Figure 2:
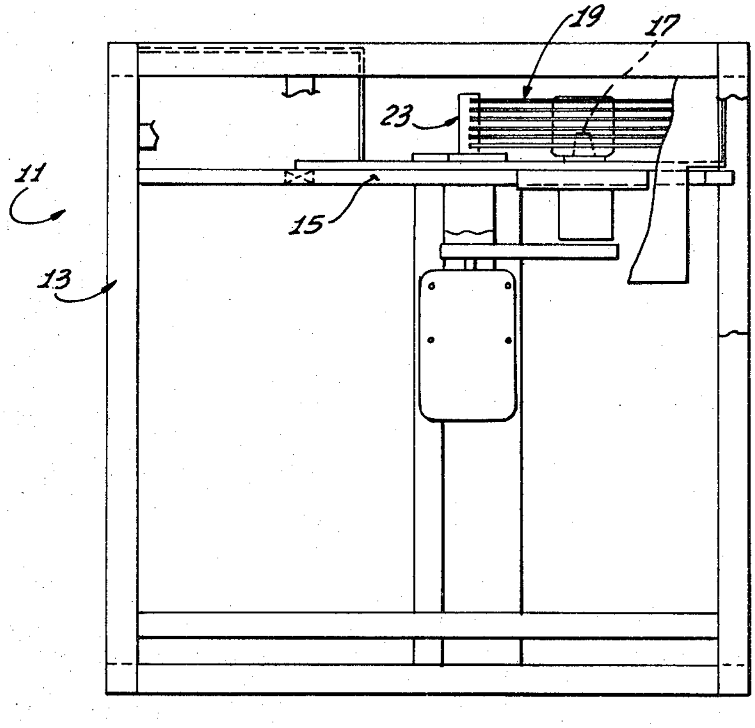
FIG. 2 is a front elevational view of the mechanical tester with portions thereof broken away to expose the interior of the device.

Referring to the drawings and in particular to FIGS. 1 and 2 thereof reference numeral 11 designates a mechanical disc pack tester constructed in accordance with the teachings of this invention. Generally, the tester 11 includes a supporting structure or table 13 having an upper wall 15 on which is mounted a spindle 17 for driving a disk pack 19 in rotation about a central vertically extending rotational axis. Static testing means 21 and dynamic testing means 23 are mounted closely adjacent the periphery of the disc pack 19 in circumferentially spaced relationship. The table 13 may be of any suitable design; however, it is preferred that the upper wall 15 be horizontal and at a convenient working elevation.

Figure 3:
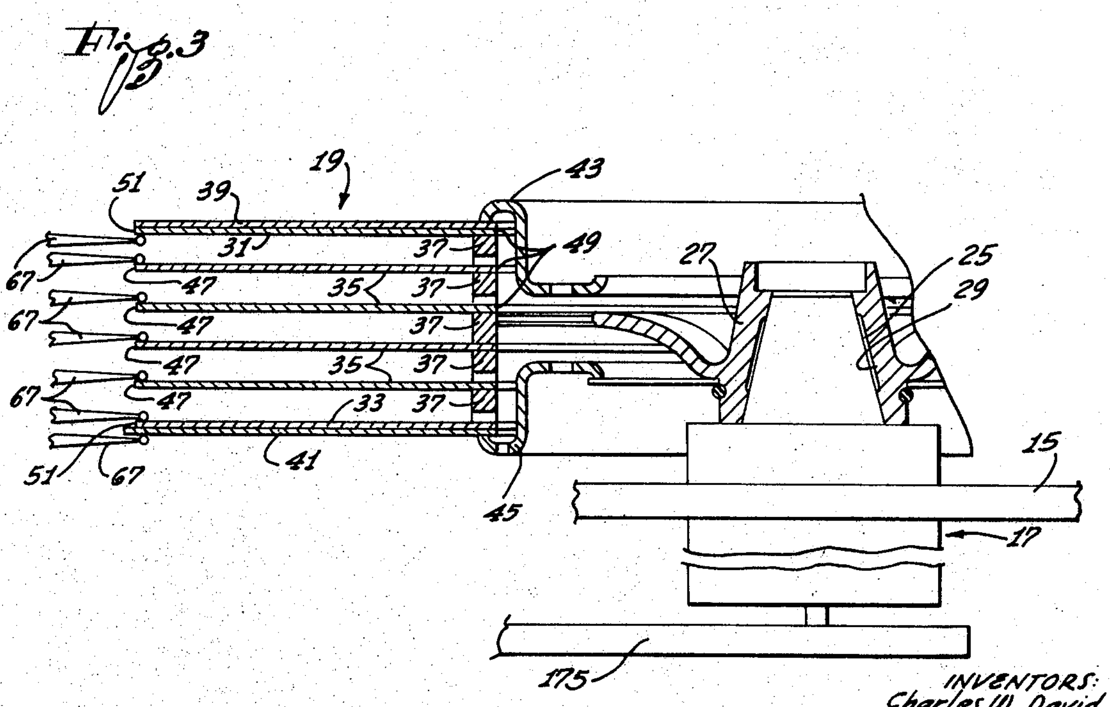
FIG. 3 is a sectional view of a typical disc pack and the probes of the static testing means.

The construction of the disk pack and the spindle 17 can best be seen in FIG. 3. Spindles for driving disc packs are well known in the art and accordingly the spindle 17 is shown schematically. It is important, however, that the spindle 17 provide a driving surface 25, preferably frustoconical, for rotating the disc pack 19.

The disc pack 19 is shown primarily for background purposes with the understanding that the present invention is applicable to disc packs of other designs. The disc pack 19 includes a hub 27 having a generally frustoconical recess 29 therein receiving the frustoconical driving surface 25 of the spindle 17. The disc pack 19 also includes an upper recording disc 31, a lower recording disc 33 and four intermediate recording discs 35. The recording discs 31, 33 and 35 are arranged in spaced stacked parallel coaxial relationship by various other members of the disc pack 19 including spacers 37. The disc pack 19 also includes a cover disc 39 and a sector disc 41 and the entire structure is held together by upper and lower clamping rings 43 and 45 which in turn are suitably secured together as by bolts (not shown).

Each of the recording discs 31, 33 and 35 are thin plate-like annular members having an outer periphery or edge 47 and an inner periphery or edge 49. The lower face of the disc 31, and upper face of the disc 33 and both the upper and lower faces of the intermediate discs 35 define recording areas on which information can be recorded. The entire face area is adapted for the recording of information thereon except for a radially narrow annular peripheral region 51 contiguous the outer edge 47 and a similar region adjacent the inner edge 49.

Figures 4, 5:
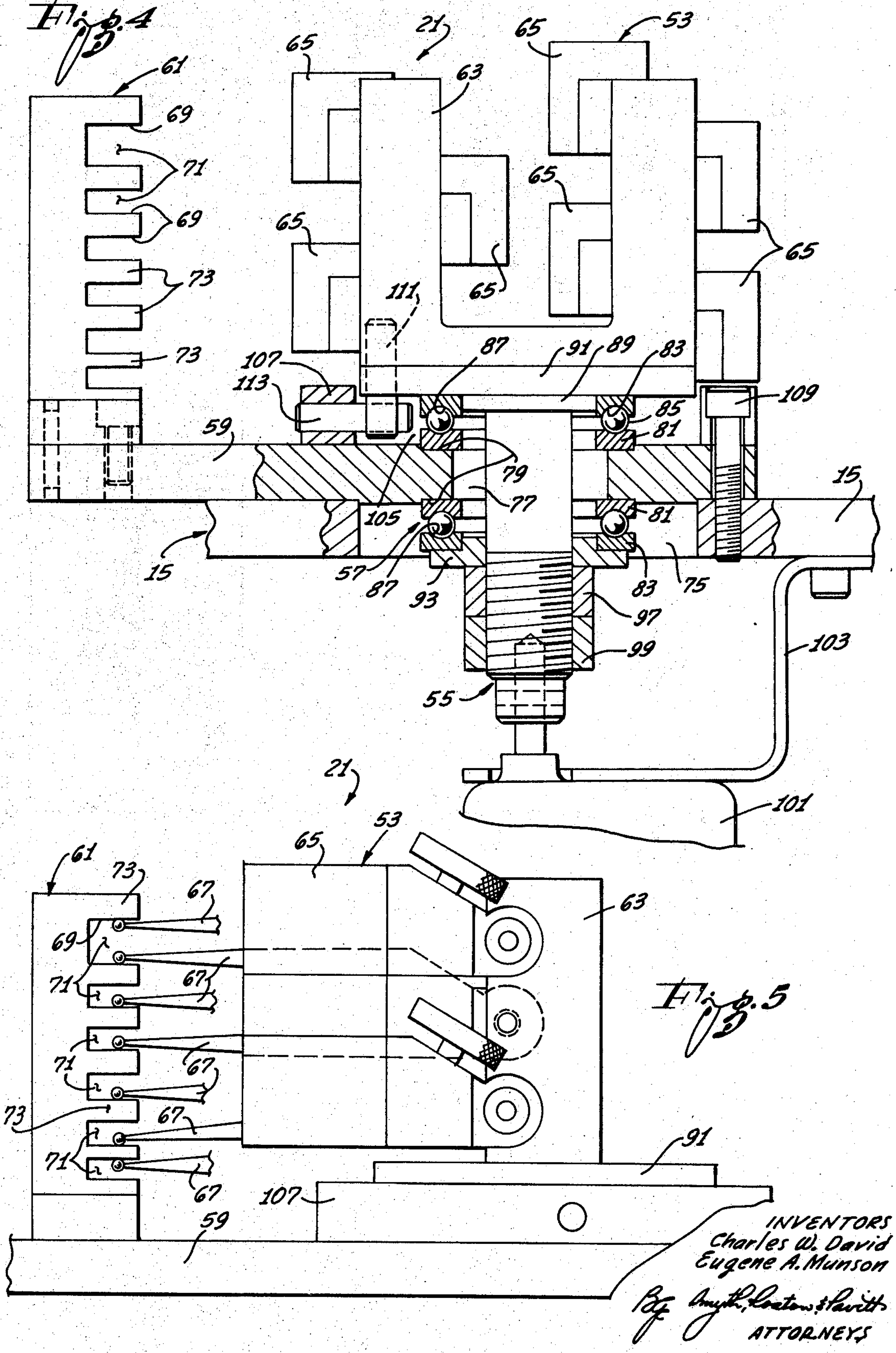
FIG. 4 is an enlarged rear elevational view partially in section of the static testing means in the operative position.
FIG. 5 is an elevational view of the static testing means in the inoperative position with the probes engaging the gauge block.

The static testing means 21 (FIGS. 1, 4 and 5) includes an electrical displacement transducer means 53 mounted on a shaft 55 for rotation between the operative position shown in FIGS. 1 and 4 and an inoperative position shown in FIG. 5. A bearing assembly 57, which is described more fully hereinbelow mounts the shaft 55 for precision rotation on a mounting plate 59, which is suitably secured to the upper wall 15 of the table 13. A calibrating gauge or gauge block 61 is suitably mounted on the mounting plate 59.

More particularly, the electrical displacement transducer means 53 includes a U-shaped mounting block 63 rigidly secured to the upper end of the shaft 55 and seven electrical displacement transducers 65 rigidly mounted on the mounting block 63. Thus, one of the electrical displacement transducers 65 is provided for each of the surfaces that is to be statically tested. Three of the transducers 65 are mounted on one leg of the mounting block 63 and the remaining four transducers are mounted on the other leg of the mounting block. Each of the transducers 65 includes an elongated movable probe 67 protruding therefrom. The transducers 65 are of the type in which an electrical signal is produced in response to movement of the probe 67 in either direction from a zero or true mean position. The electrical signal is, therefore, a function of the amount of displacement which the probe undergoes. Transducers of this type are conventional and, accordingly, the transducers 65 are not described in detail herein.

With the transducer means 53 in the operative position, the probes 67 are lightly urged into engagement with the faces of the discs 31, 33, and 35 as shown in FIG. 3. The probes 67 of the transducers 65 which are mounted on a common leg of the mounting block 63 intersect at the outer ends thereof as shown in FIG. 1 so that corresponding points on the several discs will be engaged thereby. The lower face of the disc 31 is engaged with one of the probes 67, the upper faces of the four intermediate discs 35 and of the lower disc 33 are engaged by others of the probes and the lower face of the sector disc 41, which is not a recording disc, is also engaged by one of the probes. The probes preferably engage the peripheral regions 51 of the various discs as these regions are not adapted for having information recorded thereon; however, it is possible to contact the probes directly on the recording areas of the discs without causing damage thereto.

As the disc pack 19 is slowly rotated by the spindle 17, the probes 67 ride on the faces of their respective discs and any deviation of the discs from the true mean position produces a corresponding movement of the probe. The movement of the probe 67 is converted into an electrical signal by the transducers which is in turn converted into an appropriate reading to advise the operator of the test results from various discs. Although the electrical signals could be used, for example to sound an alarm in the event that the deviation exceeded the allowable amount, it is preferred to convert the electrical signals into a continuous dial reading so that the operator can be continuously advised of the test results.

Stated differently, each of the probes 67 has a zero or true mean position which corresponds to the true mean position of the associated disc of the disc pack 19. Each probe 67 may be considered to be in the true mean position thereof if it is spaced a predetermined distance from a datum plane and similarly the discs may also be considered to be in a true mean position if they are spaced predetermined distances from such datum plane. Thus, as the surface of the face engaged by the probe 67 moves away from the true mean position, the probe is urged in one direction or the other from the true mean position to produce the electrical signal.

It is apparent that the static test described above does not test every point on both faces of all of the discs. Rather, each disc is tested in a circumscribing zone along only one face. Although each disc could be tested in several circumscribing zones or in radially extending zones, it has been found that the static test outlined hereinabove provides very satisfactory results and requires only a little time to test each disc pack 19.

The transducer means 53 is movable to the inoperative position shown in FIG. 5 in which the probes 67 are removed from the faces of the discs and will not interfere with mounting or removal of the disc pack 19 from the spindle 17. It is also necessary and desirable to calibrate each of the transducers 65 from time to time. Accordingly, the present invention automatically accomplishes this latter purpose upon movement of the transducer means 53 to the inoperative position.

More specifically, the gauge block 61 includes a plurality of vertically spaced calibrating surfaces 69 each of which defines a notch 71 between adjacent fingers 73. The various calibrating surfaces 69 are maintained at appropriate elevations so that when the associated probe contacts the surface as shown in FIG. 5, a dial (not shown) should give a zero or true mean position reading. Any deviation from the zero reading indicates the amount of error in the system. Stated in another way, the various horizontal portions of the various calibrating surfaces 69 are spaced the same distances from a datum plane that the associated faces of the discs are spaced from such datum plane when the disc pack 19 is in the true mean position.

By comparing FIGS. 3 and 5 it will be noted that the uppermost probe 67 engages the lower surface of the upper disc 31 and also the lower surface of the upper finger 73. Similarly, the four probes 47 beneath the uppermost probe engage upper surfaces of their associated finger 73 as shown in FIG. 5.

It is apparent that relative vertical movement between the transducer means 53 and either of the spindle 17 or the gauge block 61 cannot be tolerated. To this end, it is important that the table 13 rigidly supports these members in a manner to prevent such relative movement. As the transducer means 53 with the probes 67 pivot through an angle of about 90° and because the arc of movement is relatively long, it is very important that the bearing assembly 57 firmly and rigidly mount the transducer means 53 for precision pivotal movement between the operative and the inoperative positions.

In the illustrated embodiment the above noted features plus simplicity and low cost are achieved by the structure shown in FIG. 4. The upper wall 15 and the mounting plate 59 have coaxial openings 75 and 77 therethrough which the shaft 55 projects. A pair of annular grooves 79 are formed on opposite sides of the mounting plate 59 immediately surrounding the opening 77. A pair of identical bearings are mounted on opposite sides of the plate 59. Each of the bearings includes an annular inner race member 81, an annular outer race member 83, and a plurality of balls 85 intermediate the race members. Each of the inner race members 81 is snugly received in one of the grooves. Each of the race members 81 and 83 are provided with a groove 87 for retaining the balls 85 and for providing a circulatory path therefor. Thus, the outer race members 83 can rotate relative to the inner race member 81 without any substantial amount of friction.

The shaft 55 has two radially enlarged cylindrical portions 89 and 91, the former of which is received within the annular race member 83 of the upper bearing and the latter of which is secured to the mounting block 63. The lower end of the shaft 55 has a collar 93 thereon which tightly secures the shaft to the outer race member 83 of the lower bearing. The lower end of the shaft 55 has screw threads 95 for mounting a pair of nuts 97 and 99 which can be tightened to axially preload the bearing assembly 57. The shaft 55 can be rotated in either direction by a reversible electric probe motor 101 which is mounted on the underside of the wall 15 by a bracket 103.

As shown in FIG. 4, the upper end of the shaft 55 projects through an opening 105 in a block 107. The block 107 is suitably secured to the mounting plate 59 and the upper wall 15 as by bolts 109. The opening 105 is preferably coaxial with the openings 75 and 77 and is cylindrical to allow rotation of the enlarged cylindrical portion 91 of the shaft 55.

A lug 111 is rigidly mounted on the transducer means 53 and projects downwardly toward the mounting plate 59. A stop pin 113 is secured to the block 107 and projects radially inwardly into the opening 105 for engagement with the lug 111. The lug 111 and the stop pin 115 are located so that the lug will engage the pin when the transducer means 53 is in the operative position. A second stop pin 113 (not shown) can be similarly mounted in the block 107 for cooperation with the lug 111 after the lug and the transducer means 53 have been pivoted through about 90° of rotation to thereby stop the pivotal movement with the transducer means in the inoperative position.

Figure 6:
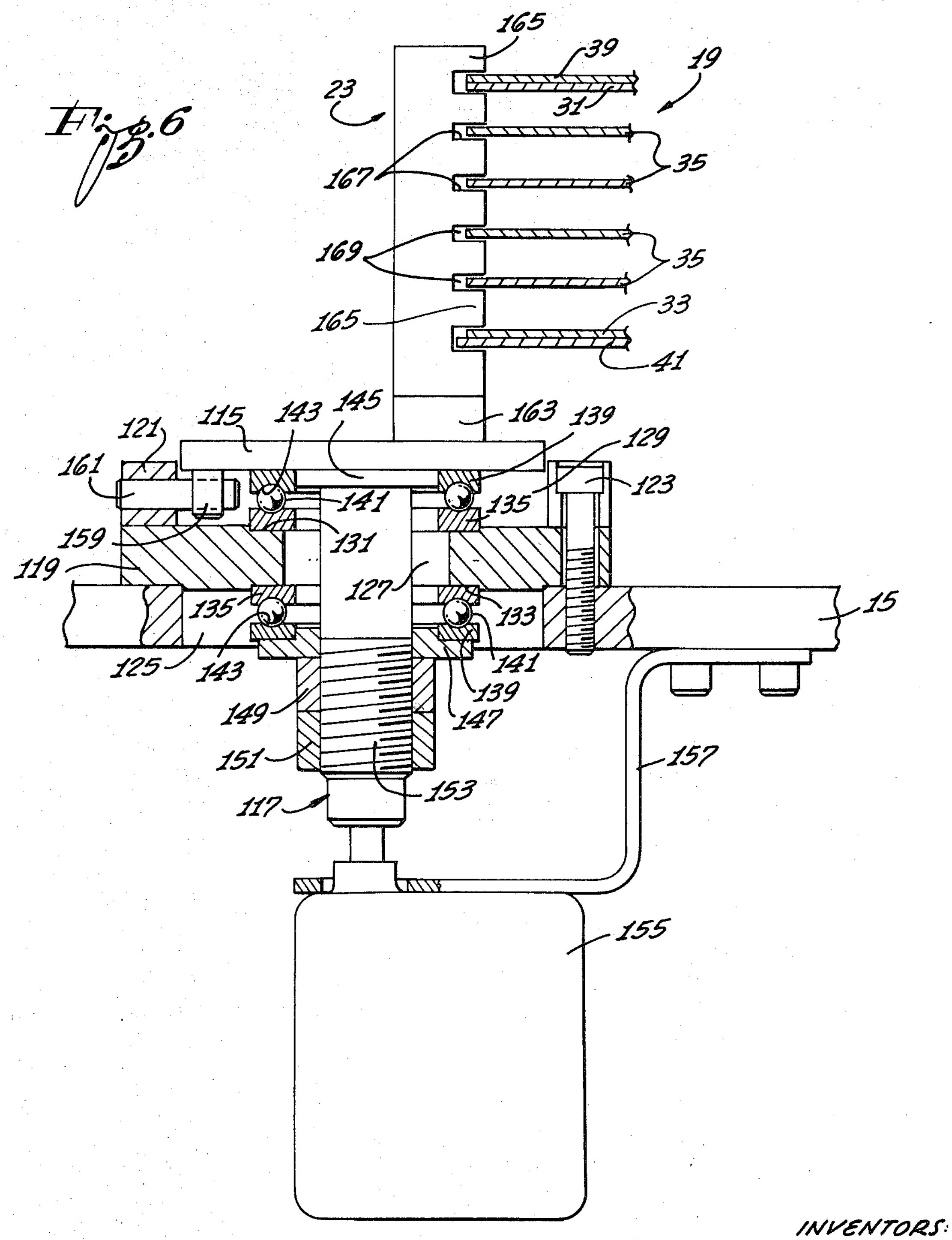
FIG. 6 is an enlarged elevational view partially in section of the dynamic testing gauge in the operative position.

FIG. 6 shows the dynamic testing gauge 23 in an operative or testing position for dynamically testing the disc pack 19. The dynamic testing gauge 23 is movable to an inoperative position in which it is substantially removed from the vicinity of the disc pack 19 so as not to interfere with the removal thereof from the spindle 17. Although any type of movement may be utilized, it is preferred to rotate the dynamic testing gauge 23 between the operative and inoperative positions thereof.

In the embodiment illustrated, this is accomplished by eccentrically mounting the dynamic testing gauge 23 on a rotatable cylindrical platform 115 which forms the upper end of a shaft 117. The shaft 117 is mounted for precision pivotal movement in substantially the same manner as the shaft 55 shown in FIG. 4. Thus, a mounting plate 119 and a platform 121 are suitably secured to the upper wall 15 of the table 13 as by bolts 123. The upper wall 15, the mounting plate 119, and the platform 121 have axially aligned cylindrical openings 125, 127 and 129, respectively, therein through which the shaft 117 projects. The mounting plate 119 has a pair of annular grooves 131 and 133 surrounding the opening 127. A pair of bearings are provided with each of the bearings including an inner race member 135 snugly received within the grooves 131 and 133, respectively, an outer race member 139, and a plurality of balls 141 which ride in a circulatory path defined by opposed grooves 143 in the race members. The outer race members 139 are mounted on the shaft 117 by a shaft enlargement 145 integral with the shaft 117 and a collar 147 mounted on the shaft adjacent the lower end thereof. A pair of nuts 149 and 151 cooperate with screw threads 153 on the shaft 117 to axially compressively preload the entire bearing assembly.

The shaft 117 is directly connected to and driven by an electric gauge motor 155 which is mounted on and beneath the upper wall 15 by a bracket 157. Two lugs 159 (only one being shown in FIG. 6) and a stop pin 161 are mounted on the platform 115 and the block 121, respectively, for defining the operative and inoperative positions of the dynamic testing gauge 23.

The dynamic testing gauge 23 is suitably secured to the platform 15 by a pair of tabs 163 (only one being shown in FIG. 6) integral therewith. The dynamic testing gauge 23 has a plurality of fingers 165 which project toward the disc pack 19 which define testing surfaces 167 and notches 169 therebetween. The notches 169 are sized to receive an outer edge portion of one of the discs with a predetermined clearance space between the surface 167 and the edge portion of the recording disc. This clearance space is sufficiently large to allow a predetermined amount of flutter or movement of the disc away from the true mean position without causing contact between the testing surface 167 and the disc. However, if the flutter exceeds a predetermined amount, i.e. exceeds the allowable tolerance, the edge portion of the disc will contact the testing surface 167 to advise the operator that the disc pack has failed the dynamic test.

The contact between the testing surface 167 and the disc may, in turn, cause any of the usual types of warning signals such as lights, buzzers, etc. to be energized. However, as the contact between the testing surface 167 and the disc will produce sound audible to the operator it is preferred to simplify the construction and allow the operator to be advised of the test results by sound or the absence of such sound.

The lowermost notch 169 is the largest because it must embrace an edge portion of the lowermost recording disc 33 and an edge portion of the sector disc 41. The uppermost notch 169 is the second largest as it must embrace edge portions of the uppermost recording disc 31 and of the cover disc 39. The four intermediate notches 169 are smaller than either of the uppermost or lowermost notches. Of course, the size and location of the notches must be adjusted depending upon the amount of flutter which is considered acceptable. By way of illustration, the distance in inches from a datum plane to each horizontal surface portion of each testing surface 167, in sequence from the lowermost notch to the uppermost notch, may be as follows: .740; .889; 1.2125; 1.2875; 1.611; 1.689; 2.0075; 2.0925; 2.406; 2.494; 2.806; 2.950; and 3.125. The notches 169 are preferably spaced so that if the discs were each at the true mean position thereof, the amount of clearance above and below the disc would be equal.

When the disc contacts the testing surface 167, the testing surface machines the disc. It is, of course, important that the dynamic testing gauge 23 be immovable in response to such contact and that the tesing surfaces 167 be sufficiently hard to withstand contact with the rotating discs without becoming worn.

The spindle 17 must drive the disc pack 19 at a slow angular velocity of the order of 5 r.p.m. during the static test and drive the disc pack at much higher velocities during the dynamic test. Although this function may be accomplished in various ways. in the specific embodiment illustrated a high speed electric motor 171 (FIG.1) capable of rotating the spindle 17 at 1500 r.p.m. and 2400 r.p.m. is suitably mounted to and beneath the upper wall 15. A low speed electric motor 173 which is capable of rotating the spindle at a suitable static testing speed such as 5 r.p.m. is also mounted to and beneath the upper wall 15. Drive means in the form of a belt 175 drivingly interconnects the motors 171 and 173 and the spindle 17 so that either of the motors can drive the other and the spindle 17. The motor 173 is provided with a centrifugal clutch which is responsive to being driven by the motor 171 and a speed in excess of the output speed of the motor 173 for making the motor 173 freewheeling thereby preventing the motor 171 from driving the motor 173 at the dynamic testing speeds.

Figure 7:
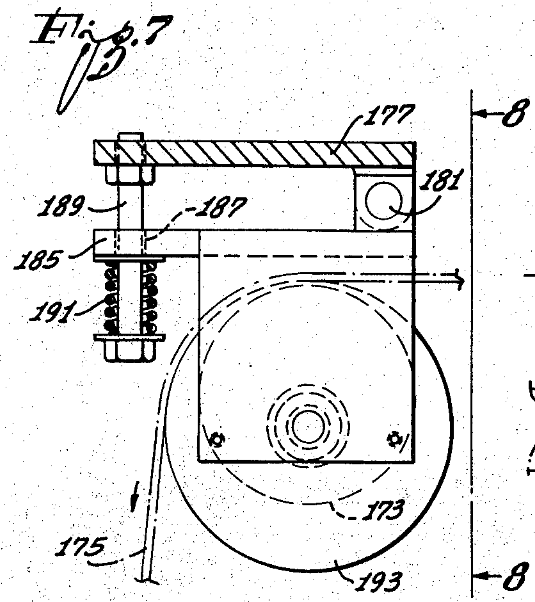
FIG. 7 is a plan view partially in section taken along line 7—7 of FIG. 8 showing a detail of the means for mounting the slow speed motor used in the static test.
Figure 8:
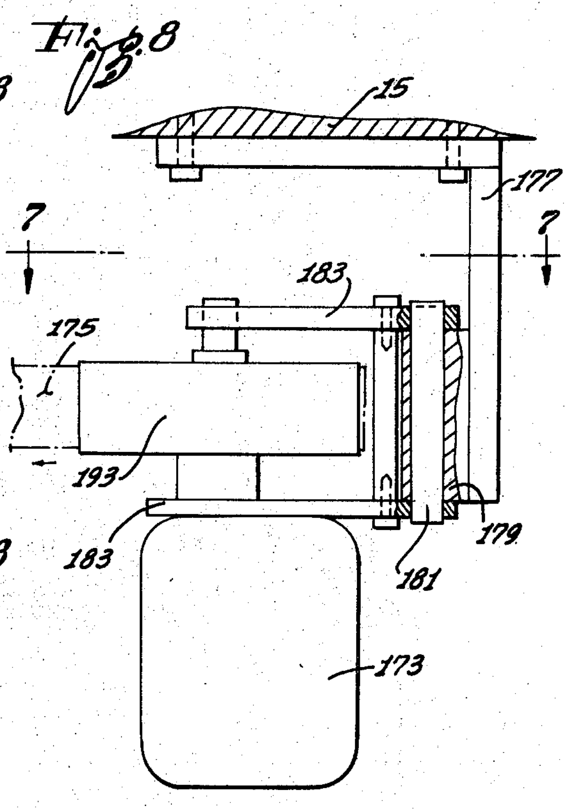
FIG. 8 is an elevational view taken along line 8—8 of FIG. 7.

FIGS. 7 and 8 show a preferred form of mounting means for the motor 173. A mounting bracket 177 is secured to the underside of the upper wall 15 and supports a vertically extending sleeve 179 beneath the upper wall 15. A shaft 181 is pivotally mounted in the sleeve 179 and has a pair of spaced parallel pulley supporting plates 183 secured to the ends thereof for pivotal movement therewith. Both of the plates 183 are secured to a plate 185 having a port 187 therein which embraces the shank portion of a bolt 189 which is secured to the mounting bracket 177. A coil spring 191 urges the tab 185 toward the mounting bracket 177 and this is resisted by the tension in the belt 175. A pulley 193 is mounted between the plates 183 and the motor 173 is mounted on the lower plate 183 and drives the pulley.

The operation of the mechanical disc pack tester 11 is as follows. With the spindle 17 stationary and with the transducer means 53 and the dynamic testing gauge 23 in the inoperative positions thereof, the disc pack 19 may be placed on the spindle 17 with the hub 27 in driving engagement with the frustoconical surface 25 of the spindle as shown in FIG. 3. It is preferred to carry out the static test first because if the disc pack 19 fails the static test, it will also quite likely fail the dynamic test. Accordingly, the motor 173 is energized to drive the spindle 17 at a slow speed and the transducer means 53 is rotated to the operative position so that the probes 67 engages the discs as shown in FIG. 3. Although seven different dials, one for each of the seven probes 67, could be provided and all of the seven discs could be statically tested simultaneously, it is preferred to utilize a single dial and sequentially test each of the discs thereby permitting the operator to give the single dial his undivided attention. Thus, the probe which is engaging the first disc to be tested is moved by the deviation of the disc from the true mean position to cause the associated transducer 65 to produce an electrical signal which is a function of probe displacement. The electrical signal is then preferably converted into a dial reading visible to the operator. The operator then operates a selector to cause the same dial to give readings on the deviation of a second disc from the true mean position. After all seven of the discs have been tested, the transducer means 53 is rotated to the inoperative position in which the probes 67 engage the gauge blocks 61 as shown in FIG. 5. At this time, or prior to running the static test, the static testing means 21 can be calibrated by the gauge block 61 by noting on the dial the deviation, if any, from the zero reading for each of the probes.

Next, the motor 171 is energized to increase the speed of the disc pack 19 to a dynamic testing speed which corresponds to one of the rotational speeds of the pack during actual use. Such a speed may be 1500 r.p.m. However, the centrifugal clutch on the motor 173 causes this motor to be freewheeling when the motor 171 drives the motor 173 at a speed greater than the output speed of the motor 173. The dynamic testing gauge 23 is preferably held in the inoperative position during the acceleration of the disc pack 19 to the dynamic testing speed in order that any flutter occurring at lesser speeds will not cause the pack to engage the dynamic testing gauge. When the dynamic testing speed is reached, the gauge 23 is automatically moved to the operative position thereof for only a short period of time and then the gauge is automatically returned to the inoperative position.

As the disc pack may be used at a second speed it is desirable to test the disc pack at a second dynamic testing speed such as 2400 r.p.m. Accordingly, the motor 171 is energized to accelerate the pack to the second dynamic testing speed during which time the dynamic testing gauge is automatically retained in inoperative position. When the disc pack is rotating at 2400 r.p.m., the dynamic testing auge 23 is again moved to the operative position for a brief interval following which the dynamic testing gauge 23 automatically returns to the inoperative position and the disc pack 19 is removed from the spindle 17.

Figure 9:
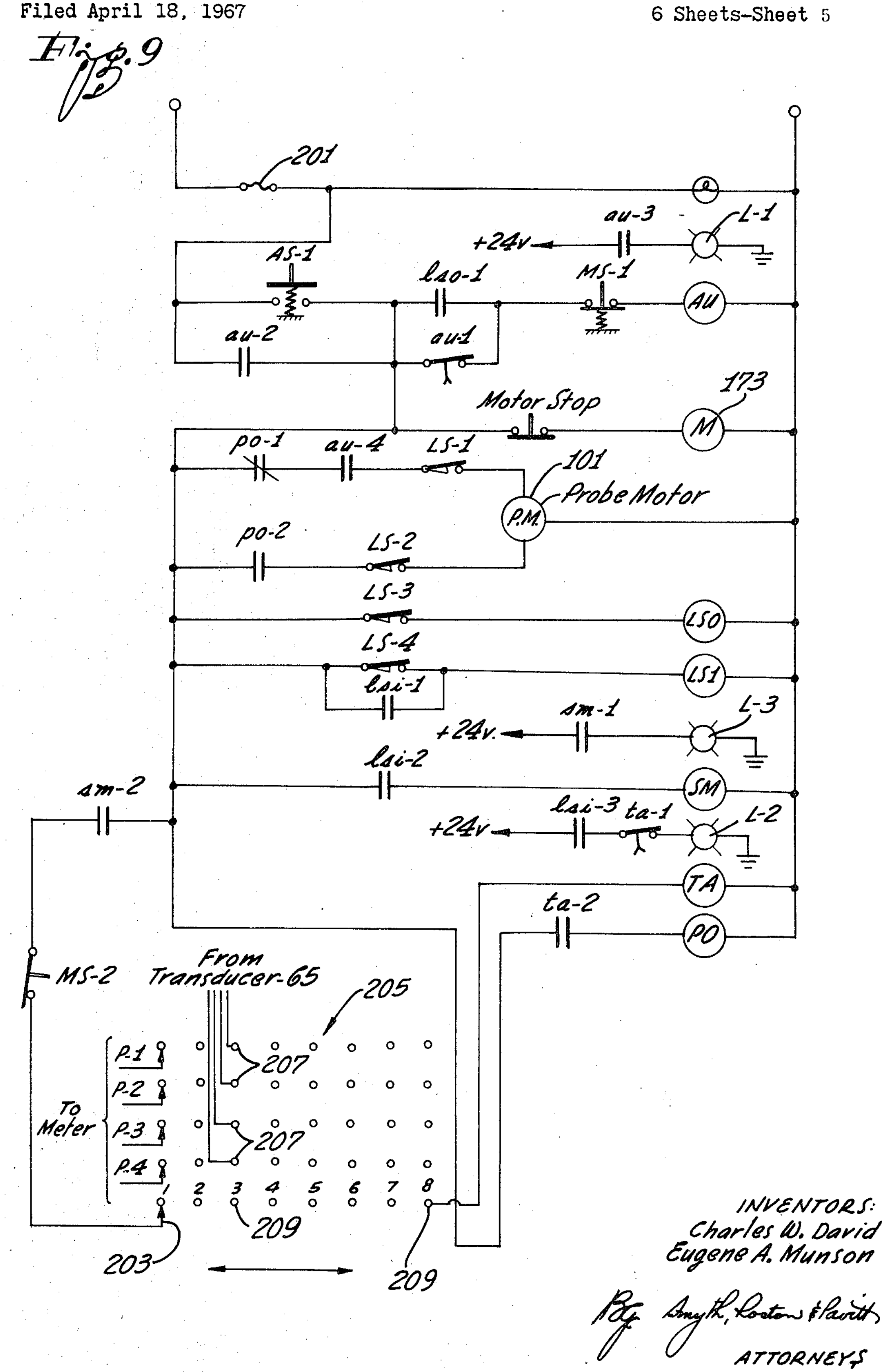
FIGS. 9 and 10 are schematic wiring diagrams of a preferred form of control system for the mechanical tester.
Figure 10:
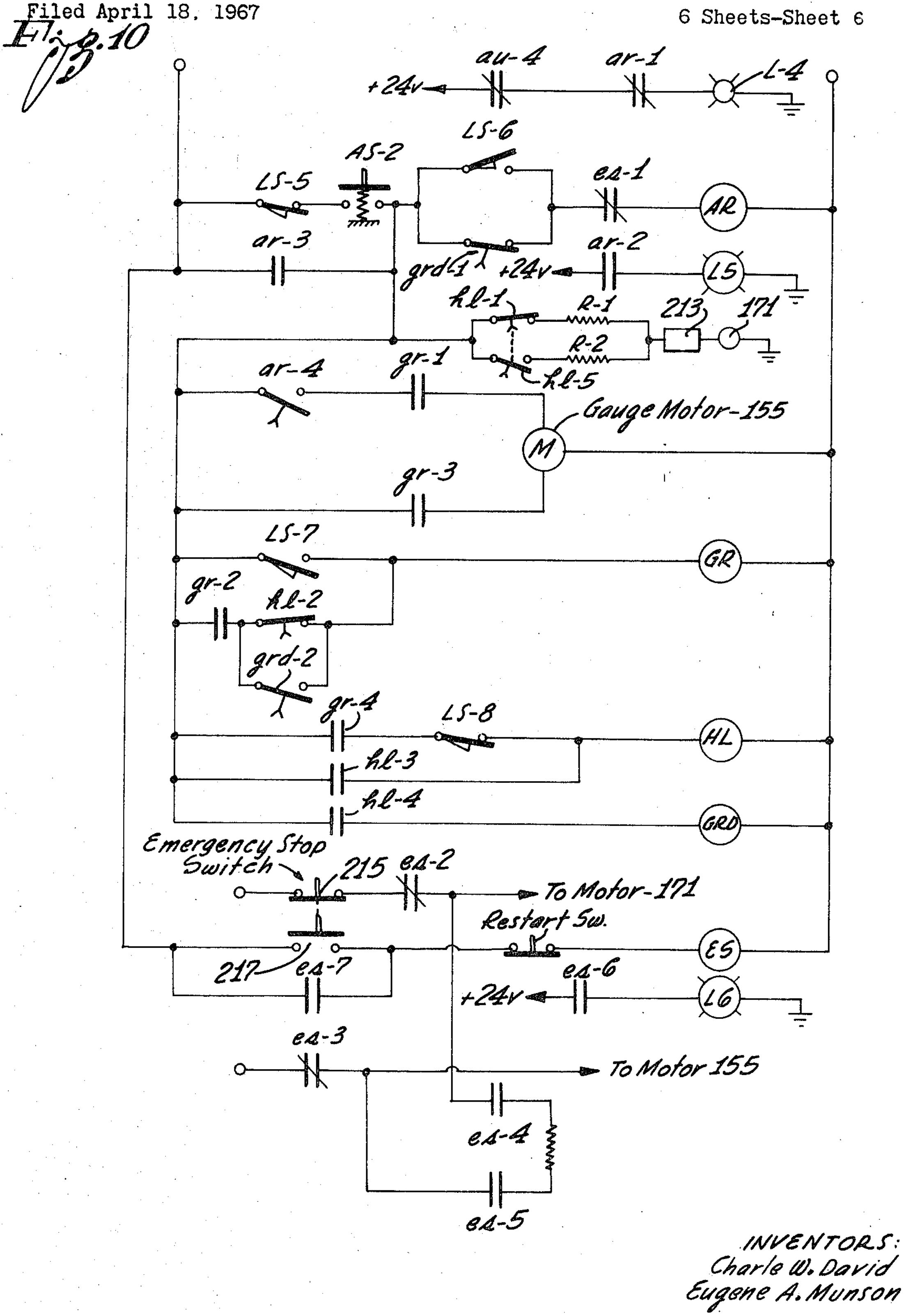

The operation described above is preferably carried out almost entirely automatically. Although various control circuits may be utilized, the control circuitry illustrated in FIG. 9 and 10 is preferred in that a minimum number of contacts are utilized. In FIGS. 9 and 10, the circuit is shown in the de-energized condition and with the transducer means 53 and the dynamic testing gauge 23 in their inoperative positions.

As shown in FIG. 9, 115 volt alternating current is supplied through a fuse 201 to an automatic start switch AS–1 so that upon manual closing of this switch, current is supplied through normally closed time delay contacts au–1 and a manual stop switch MS–1 to energize a relay AU. Energization of the relay AU closes normally open contacts *au–2* so that upon manual release the automatic start switch AS–1, the relay AU remains energized. Energization of the relay AU also closes normally open contacts *au–3* to illuminate an indicator light L–1.

The closing of the switch AS–1 and of the contacts *au–2* energizes the slow speed motor 173 through a motor stop switch. Simultaneously, current is supplied to the probe motor 101 through normally closed contacts *po–1*, contacts *au–4* which were closed upon the energization of the relay AU and a normally closed limit switch LS–1. The probe motor 101 then rotates the transducer means 53 to the operative position in which the movable probes 67 engage the faces of the various discs.

The limit switch LS–1 and three other limit switches LS–2, LS–3, and LS–4 are all suitably mounted to be operated by the transducer means 53. When the transducer means 53 moves out of the inoperative position the limit switches LS–2 and LS–3 close and when the operative position is reached limit switch LS–1 opens and limit switch LS–4 closes. Opening of the limit switch LS–1 breaks the circuit to the probe motor 101 and closure of the limit switch LS–3 energizes a relay LSO to close normally open contacts *lso*–1 so that upon opening of time delay contacts *au*–1, relay AU remains energized. Closure of the contacts *ls*–4 energizes a relay LSI which closes normally open contacts *lsi*–1 to hold the relay LSI in the energized condition. Energization of the relay LSI also closes normally open contacts *lsi*–2 to energize a relay SM and closes normally open contacts *lsi*–3 to illuminate an indicator light L–2 through normally closed time delay contacts *ta*–1.

Energization of the relay SM closes normally open contacts *sm*–1 to illuminate an indicator light L–3 and closes normally open contacts *sm*–2 which supplies current to a manually operable switch MS–2 which is electrically connected to a movable contact 203 of a selector 205. The selector 205 has four other movable contacts P–1, P–2, P–3, and P–4 which are electrically connected to a meter or dial (not shown). The movable contacts 203 and P–1 through P–4 can be moved in unison selectively between eight stations designated accordingly by the numerals 1 through 8, respectively. Each of these stations has four fixed contacts 207 which are electrically connected to one of the transducers 65, and are engageable by the movable contacts P–1 through P–4, respectively. Each of the eight stations also has a fifth fixed contact 209 which is engageable by the movable contact 203. Only the fixed contact 209 located at station 8 is electrically connected to the external circuitry and this latter fixed contact is electrically connected to a relay TA.

Thus, with the selector 205 in position number 1, as shown in FIG. 9, the meter will provide a visual reading in accordance with test data which has been taken by the first transducer 65. By manually moving the contacts 203, P–1, P–2, P–3, and P–4 of the selector 205 to station 2, the same meter will provide numerical readings which are a function of the electrical signal from a second one of the transducers 65. Thus, although all of the probes 67 simultaneously engage their respective discs while the disc pack 19 is being rotated by the motor 173, the operator manually simultaneously moves the movable contacts of the selector 205 between the various positions thereof to sequentially observe the test data from each of the transducers.

When the operator moves the movable contacts to position No. 8, the movable contact 203 completes a circuit from the contact *sm*–2 to energize the relay TA. Energization of the relay TA closes the contact *ta*–2 to energize the relay PO and, after a predetermined delay, opens the contact *ta*–1 to extinguish the indicator light L–2.

Energization of the relay PO opens the contacts *po*–1 and closes the contacts *po*–2 to reverse the potential across the probe motor 101 to cause the probe motor to reverse and move the probes to the retracted or inoperative position. When the transducer means 53 reaches the inoperative position, the limit switches LS–2 and LS–3 open to de-energize the probe motor 101 and to de-energize the relay LSO. De-energization of the relay LSO causes the contacts *lso*–1 to open and, the time delay contacts *au*–1 having previously been opened, the relay AU is de-energized. This opens the contacts *au*–2 to deenergize the entire circuit .

Of course, movement of the transducer means 53 to the inoperative position closes the limit switch LS–1 and opens the limit switch LS–4.

FIG. 10 shows one preferred form of circuitry for controlling the dynamic test portion of the cycle. Preferably, the dynamic test is carried out following the static test. With the dynamic testing gauge 23 in the inoperative or retracted position thereof, the cycle can be initiated by manually closing an automatic start switch AS–2 to energize a relay AR through a normally closed limit switch LS–5, normally closed time delay contacts *grd*–1, and normally closed contacts *es*–1. Energization of the relay AR opens normally closed contacts *ar*–1 to prevent energization of an indicator light L–4 and closes normally open contacts *ar*–2 to illuminate another indicator light L–5. Normally open contacts *ar*–3 are closed by the energization of the relay AR to supply power to the remainder of the system.

Closure of the automatic start switch AS–2 and the contacts *ar*–3 supplies 115 volt AC power to the DC motor 171 through normally closed time delay contacts *hl*–1, a resistor R–1 and a rectifier 213. The valve of the resistor R–1 is selected so that the DC motor will be supplied with power at the proper voltage to cause the motor to run at the first dynamic testing speed which, in the embodiment illustrated, is 1500 r.p.m. After a predetermined time delay, which may be approximately 40 seconds, to allow the motor 171 to accelerate the disc pack 19 to 1500 r.p.m., normally open time delay contacts *ar*–4 close to energize the gauge motor 155 through normally closed contacts *gr*–1. The gauge motor 155 then operates to move the dynamic testing gauge 23 from the inoperative position to the operative position. As soon as the dynamic testing gauge 23 leaves the operative position, the limit switch LS–5 opens and the limit switch LS–6 closes. Thus, current can be supplied to the relay AR through the contacts *ar*–3 and the limit switch LS–6. It should be noted that the limit switch LS–5 prevents starting of the motor 171 when the gauge 23 is out of the inoperative position.

When the gauge 23 reaches the operative position, a limit switch LS–7 closes to energize a relay GR which causes closure of normally open contacts *gr*–2 to provide a holding circuit for the relay GR through the contacts *gr*–2 and a pair of normally closed time delay contacts *hl*–2. Energization of the relay GR opens the normally closed contacts *gr*–1 and closes the normally open contacts *gr*–3 to reverse the potential across the gauge motor 151 to cause the gauge motor to move the dynamic testing gauge 23 to the inoperative position. Thus, the dynamic testing gauge 23 is maintained only momentarily in the operative position and returns to the inoperative position in response to closing of the limit switch LS–7.

Energization of the relay GR also closes normally open contacts *gr*–4 to energize a relay HL through a limit switch LS–8. The limit switch LS–8 is closed when the gauge 23 is in the inoperative position and opens as soon as the gauge 23 begins its movement toward the operative position. Thus, the relay HL does not become energized until the gauge 23 returns to the inoperative position. Normally open contacts *hl*–3 close with the energization of the relay HL to provide a holding circuit for this relay. Similarly, normally open contacts *hl*–4 close to energize a relay GRD.

Next, time delay contacts *hl*–1 open and simultaneously normally open time delay contacts *hl*–5 close. The motor 171 is now supplied with voltage through a resistor R–2 which has less resistance than the resistor R–1. The value of the resistance R–2 is selected so that the motor 171 will accelerate to a second dynamic testing speed, which, in the embodiment illustrated is 2400 r.p.m.

After a predetermined time delay, to allow the disc pack 19 to be accelerated to 2400 r.p.m., the normally closed time delay contacts *hl*–2 open while normally open time delay contacts *grd*–2 remain open. As the limit switch LS–7 is open when the gauge 23 is in the inoperative position and does not close until the gauge has been completely moved to the operative position, the relay GR is de-energized. This closes the contacts *gr*–1 and opens the contacts *gr*–3 to again reverse the potential across the gauge motor 155 to cause the gauge motor to rotate the gauge 23 toward the operative position. By the time the gauge 23 has moved to the operative position to close the limit switch LS–7, the normally open time delay contacts *grd*–2 are closed. Thus, the relay GR is initially energized by closure of the limit switch LS–7 and is thereafter held in by contacts *gr*–2 which close in rsponse to energization of the relay GR and contacts *grd*–2. With the relay GR energized, the contacts *gr*–1 open and the contacts *gr*–3 close to cause the gauge motor 155 to move the gauge 23 back to the inoperative position. Thus, the gauge 23 is in the operative position only momentarily.

When the gauge 23 reaches the inoperative position, the limit switch LS–6 opens and immediately thereafter the normally closed time delay contacts *grd*–1 also open. This de-energizes the relay AR to open the contacts *ar*–3 and de-energize the entire circuit. It should be noted that the above controls do not permit acceleration of the motor 171 when the gauge 23 is in the operative position. Thus, there is no danger that any harmonics or rather vibrations caused by dynamic forces at intermediate speeds can operate to cause contact between the disc pack 19 and the gauge 23.

Preferably, the control system provides an emergency stop system. The emergency stop system shown in FIG. 10 includes normally closed contacts *es*–2 and *es*–3 in series with the power supply to the motors 171 and 155, respectively. A manually operable emergency stop switch has normally closed contacts 215 and normally open contacts 217. When the emergency stop switch is manually actuated, the contacts 215 are opened and the contacts 217 are closed to energize a relay ES through a manually operated normally closed restart switch. This causes opening of the normally closed contacts *es*–1 to de-energize the relay AR and opening of the normally closed contacts *es*–2 and *es*–3 to directly cut the power supply to the motors 171 and 155. Contacts *es*–4 and *es*–5 close and to electrically interconnect the two motors 171 and 155 and the contacts *es*–6 close to energize an indicator light L–6. The relay ES is held in by closure of normally open contacts *es*–7. The system can be restarted by manually depressing the restart switch to de-energize the relay ES.

Although an exemplary embodiment of the invention is shown and described, many changes, modifications and substitutions may be made by one having ordinary skill in the art without necessarily departing from the spirit and scope of this invention.

We claim:

1. A method of dynamically testing a disc pack wherein the disc pack includes at least one recording disc having a true mean position comprising:

providing a dynamic testing gauge having a testing surface;

rotating the disc pack about a central rotational axis at a dynamic testing speed sufficient to subject the disc pack to dynamic forces and allowing the disc pack to move during the rotation thereof in response to such dynamic forces to thereby permit movement of said one recording disc away from the true mean position thereof; and positioning said dynamic testing gauge with the testing surface thereof being spaced a predetermined amount from the true mean position of said one recording disc whereby if the movement of said one recording disc is of more than said predetermined amount the recording disc will contact said surface to thereby advise the operator that said disc pack does not pass the dynamic test.

2. A method as defined in claim 1 including holding said testing surface relatively firmly against movement in a direction generally toward and away from said true mean position while the disc pack is rotating and with the dynamic testing gauge spaced said predetermined amount from said true mean position.

3. A method as defined in claim 1 including changing the rotational speed of said disc pack from said dynamic testing speed to a second dynamic testing speed which approximates a speed at which the disc pack may be rotated during use thereof and dynamically testing the disc pack at said second dynamic testing speed with said dynamic testing gauge.

4. A method as defined in claim 1 wherein said step of positioning occurs after the disc pack is rotating at about said dynamic testing speed whereby any movement produced at other rotational speeds will not cause contact between said one recording disc and said testing surface.

5. In a method of dynamically testing a disc pack wherein the disc pack includes at least one recording disc having a true mean position, the steps of:

providing a go-no go dynamic testing gauge having a surface defining a notch sized to receive an edge portion of said one recording disc with a clearance space between said surface and the edge portion of said one recording disc;

positioning the dynamic testing gauge with the notch receiving the edge portion of said one recording disc and with the notch being positioned to accommodate a predetermined amount of movement of said one recording disc toward and away from said true mean position; and rotating the disc pack at a dynamic testing speed sufficient to subject the disc pack to dynamic forces whereby movement of said one recording disc beyond said predetermined amount will cause the edge portion thereof to engage said surface to thereby advise the operator that said disc pack does not pass the dynamic test.

6. A method as defined in claim 5 wherein the disc pack includes a plurality of spaced stacked recording discs and said dynamic testing gauge includes a gauge comb having a plurality of notches with each of said notches being sized to receive an edge portion of an adjacent recording disc, said step of positioning includes positioning the gauge comb with each of the notches receiving the edge portion of the adjacent recording disc whereby a plurality of the recording discs can be dynamically tested simultaneously.

7. A method as defined in claim 6 wherein the gauge comb is maintained in a position spaced from said disc pack until said disc pack reaches said dynamic testing speed and said step of positioning occurs after the disc pack is rotating at substantially said dynamic testing speed, said method also including changing the rotational speed of the disc pack to a second speed approximating a second dynamic testing speed and dynamically testing the recording discs at the second dynamic testing speed utilizing said gauge comb.

8. In a device for testing a disc pack wherein the disc pack includes at least one recording disc having a face and the recording disc has a true mean position in which the recording disc is positioned as desired, the combination of:

a supporting structure;

spindle means on said supporting structure for mounting the disc pack for rotation about a central rotational axis;

means for rotating the disc pack at a dynamic testing speed at which the disc pack is subjected to dynamic forces tending to cause the recording disc to move away from the true mean position thereof; and a dynamic testing gauge including a body having a testing surface defining a notch sized to receive an edge portion of the recording disc, said dynamic testing gauge being positionable to receive said edge portion with the testing surface being a predetermined distance away from the true mean position of the recording disc, said testing surface being substantially immovable in a direction generally toward and away from said true mean position when the dynamic testing gauge is positioned to receive the edge portion of the recording disc whereby movement of the recording disc more than said predetermined distance away from the true mean position thereof will cause contact between the recording disc and said testing surface.

9. A combination as defined in claim 8 including means for moving the dynamic testing gauge between an operative position in which the notch embraces the edge portion of the recording disc and an inoperative position in which the edge portion of the recording disc is out of said notch to facilitate removal of the disc pack from the spindle means.

10. A combination as defined in claim 8 including means for statically testing the recording disc mounted on said supporting structure, said static testing means including a movable probe engageable with the face of the recording disc to ride thereon as the disc rotates whereby deviation of the surface of said face from the true mean position produces movement of said probe, and means for converting the movement of the probe into a reading observable by an operator if the deviation of the surface from the true mean position exceeds a predetermined magnitude.

11. In a device for testing a disc pack wherein the disc pack includes at least one recording disc having a face with a true mean position, the combination of:

a supporting structure;

means on said supporting structure for mounting the disc pack for rotation about a central rotational axis;

electrical displacement transducer means on said supporting structure including a movable probe engageable with the face of said one recording disc to ride thereon as the disc pack rotates whereby deviation of the surface of said face from the true mean position produces movement of said probe and means for converting the movement of said probe into a reading observable by an operator at least when the deviation from the true mean position exceeds a predetermined magnitude;

means for mounting said movable probe on said supporting structure for movement between an operative position in which said probe is engageable with the face of said one recording disc and an inoperative position in which the probe is spaced from the face of said one recording disc to facilitate removal of the disc pack from the first-mentioned means; and gauge block means mounted on said supporting structure for accurately calibrating the electrical displacement transducer means, said movable probe being movable into engagement with said gauge block means.

12. A combination as defined in claim 11 wherein said gauge block means includes a body member having a surface defining a notch and said movable probe is engageable with said surface in the inoperative position thereof whereby said probe is automatically calibrated upon movement thereof to said inoperative position.

13. In a device for testing a disc pack wherein the disc pack includes at least one recording disc having a face with a true mean position, the combination of:

a supporting structure;

means on said supporting structure for mounting the disc pack for rotation about a central rotational axis;

electrical displacement transducer means on said supporting structure including a movable probe engageable with the face of said one recording disc to ride thereon as the disc pack rotates whereby deviation of the surface of said face from the true mean position produces movement of said probe and means for converting the movement of said probe into a reading observable by an operator at least when the deviation from the true mean position exceeds a predetermined magnitude;

means for mounting said movable probe on said supporting structure for movement between an operative position in which said probe is engageable with the face of said one recording disc and an inoperative position in which the probe is spaced from the face of said one recording disc to facilitate removal of the disc pack from the first-mentioned means; and the disc pack including a plurality of recording discs and said electrical displacement transducer means includes a plurality of probes with each of the probes being engageable with a face of one of the discs whereby the deviation of each of the recording discs from the true mean position can be checked.

14. A device for testing a disc pack wherein the disc pack includes a plurality of recording discs arranged in spaced stacked relationship with each of said recording discs having a face with a true mean position, said device comprising:

a supporting structure;

means on said supporting structure for mounting the disc pack for rotation about a central rotational axis;

a plurality of electrical displacement transducers mounted on said supporting structure, each of said transducers including a movable probe engageable with the face of one of the recording discs whereby deviation of the face from the true mean position thereof produces movement of the probe as the disc pack rotates, said transducers including means for converting the movement of said probes into a reading observable by an operator at least when the deviation from the true mean position of any one of said recording discs exceeds a predetermined magnitude;

means for mounting said transducers for movement as a unit between a first position in which said probes are engageable with the faces of their respective recording discs and a second position in which said probes are located radially outwardly of the periphery of said discs to thereby facilitate removal of the disc pack from said first-mentioned means; and a gauge block mounted on said supporting structure, said gauge block having a plurality of spaced calibrating surfaces with one of said surfaces being provided for each of said probes, said gauge block being positioned so that said probes engage said surfaces of said gauge block, respectively, in said second position of said transducers whereby said probes can be automatically calibrated upon movement thereof to said second position.

15. In a method of testing a disc pack wherein the disc pack includes at least one recording disc having a face and a true mean position, the steps of:

mechanically detecting the deviation of the face of said one recording disc from the true mean position to produce an output fluctuating in response to such deviation;

converting the mechanical output to a reading perceptible to an operator to advise the operator if the deviation exceeds a predetermined magnitude;

rotating the disc pack about a rotational axis at a dynamic testing speed to subject the disc pack to dynamic forces to cause dynamically induced movement of said one recording disc away from the true mean position for such recording disc;

positioning a dynamic testing gauge adjacent the true mean position of the recording disc so that if the dynamically induced movement of said recording disc exceeds a predetermined amount the recording disc will contact the dynamic testing gauge;

said step of mechanically detecting including contacting the face of the said one recording disc with a mechanical element while rotating the disc pack at a speed less than said dynamic testing speed and sufficiently low to allow the mechanical element to follow the surface contour variations of the face, and including the steps of removing the mechanical element from the face of said one recording disc following said step of converting and accelerating the disc pack to the dynamic testing speed; and the dynamic testing gauge having a surface defining a notch sized to receive an edge portion of said one recording disc with a clearance space between said surface and the edge portion of said one recording disc and, said step of positioning including positioning the gauge with the notch receiving the edge portion of said one recording disc.

16. A method of testing a disc pack wherein the disc pack includes at least one recording disc having a face and a true mean position, the steps of:

contacting the face of the recording disc with a probe;

rotating the disc pack at a static testing speed with said probe contacting the face of the recording disc to thereby cause the recording disc to move the probe in accordance with the deviation of the recording disc from the true mean position;

converting the movement of the probe to a reading perceptible to an operator to advise the operator if the deviation exceeds a predetermined magnitude;

taking said probe out of contact with said recording disc;

rotating the disc pack about a rotational axis at a dynamic testing speed which is substantially greater than said static testing speed to subject the disc pack to dynamic forces to thereby tend to cause dynamically induced movement of said one recording disc away from the true mean position for such recording disc, said probe being out of contact with the recording disc when the disc pack is rotating at said dynamic testing speed; and positioning a dynamic testing gauge adjacent the true mean position of the recording disc so that if the dynamically induced movement of said recording disc exceeds a predetermined amount the recording disc will contact the dynamic testing gauge.

17. A method as defined in claim 46 wherein said step of contacting and said first mentioned step of rotating are accomplished before said step of positioning and said second mentioned step of rotating and said step of positioning is accomplished when the disc is rotating at approximately said dynamic testing speed.

18. A device for testing a disc pack wherein the disc pack includes at least one recording disc having a face and a true mean position comprising:

a supporting structure;

spindle means on said supporting structure for mounting the disc pack for rotation about a central rotational axis;

means for rotating the spindle means to thereby rotate the disc pack at a static testing speed and at a dynamic testing speed at which dynamic forces act on the disc pack and tend to move the recording disc out of said true mean position, said dynamic testing speed being substantially faster than said static testing speed;

static testing means mounted on said supporting structure and having a portion thereof engageable with the face of the recording disc when the disc pack is rotating at said static testing speed to measure the deviation of a plurality of points on the face of the disc from the true mean position;

said portion of said static testing means being mounted for movement out of engagement with said face of the recording disc; and a dynamic testing gauge mounted on said supporting structure adjacent the disc pack, said dynamic testing gauge having a testing surface spaced a predetermined amount from said true mean position and engageable with the recording disc if the movement of the recording disc away from the true mean position during the rotation thereof at said dynamic testing speed exceeds said predetermined amount.

19. A combination as defined in claim 48 wherein said means for rotating the spindle means includes a first motor mounted on said supporting structure for driving said disc pack at said static testing speed;

a second motor mounted on said supporting structure for driving the disc pack at the dynamic testing speed;

drive means between both of said motors and said spindle means whereby either of said motors can drive said spindle means in rotation and the second motor can drive said first motor; and centrifugal clutch means responsive to being driven by said second motor at a speed in excess of said static testing speed for making said first motor free wheeling at a speed above said static testing speed.

20. A combination as defined in claim 18 wherein said supporting structure includes a plate having an opening therethrough and including means for pivoting said dynamic testing gauge between an operative position in which the dynamic testing gauge is engageable with the recording disc if the movement of the recording disc away from the true mean position exceeds said predetermined amount and an inoperative position in which said dynamic testing gauge is substantially separated from the disc pack, said last mentioned means including first and second bearings mounted on opposite sides of said plate member and generally coaxial with said opening, each of said bearings including a plurality of balls and first and second annular race members for providing a circulatory path therebetween for said balls, each of said first race members being rigidly affixed to said plate member, on opposite sides of said plate member and each of said second race members being rotatable relative to the associated first race member, and a shaft rigidly affixed to each of said second race member, and a shaft rigidly affixed to each of said second race members and drivingly connected to said dynamic testing gauge whereby rotation of said shaft with said second members causes pivotal movement of said dynamic testing gauge.

References Cited

UNITED STATES PATENTS

| | | | |
|---|---|---|---|
| 1,951,875 | 3/1934 | Laabs | 74—661 |
| 2,356,590 | 8/1944 | Jacobsen | 74—661 |
| 2,579,664 | 12/1951 | Gleasman | 33—168 |
| 2,600,687 | 6/1952 | Presser | 308—230 |
| 2,601,447 | 6/1952 | Neff | 33—174(Q) |
| 3,201,873 | 8/1965 | Bell et al. | 33—168(A) |

FOREIGN PATENTS

| | | | |
|---|---|---|---|
| 887,651 | 1943 | France | 33—174 |

SAMUEL S. MATTHEWS, Primary Examiner